United States Patent [19]

Polic

[11] Patent Number: 5,280,134
[45] Date of Patent: Jan. 18, 1994

[54] PACKING ELEMENT

[75] Inventor: Marko Polic, Sindelfingen, Fed. Rep. of Germany

[73] Assignee: Mercedes-Benz AG, Fed. Rep. of Germany

[21] Appl. No.: 857,404

[22] Filed: Mar. 24, 1992

[30] Foreign Application Priority Data

Mar. 26, 1991 [DE] Fed. Rep. of Germany ....... 4109804

[51] Int. Cl.$^5$ ............................................. H02G 3/06
[52] U.S. Cl. ................................. 174/65 R; 285/162
[58] Field of Search ................ 174/65; 285/222, 162, 285/194

[56] References Cited

U.S. PATENT DOCUMENTS

| | | | |
|---|---|---|---|
| 4,621,166 | 11/1986 | Neuroth | 174/65 R |
| 4,861,282 | 8/1989 | Kobayashi et al. | |
| 5,132,493 | 7/1992 | Sheehan | 174/65 R |

Primary Examiner—Harold Broome
Attorney, Agent, or Firm—Evenson, McKeown, Edwards & Lenahan

[57] ABSTRACT

A protective packing element bears at its end 5 which is to be fixed on a wall opening a coupling piece which can be locked therein. The coupling piece is equipped with tongue-like locking elements and can be plugged onto a plug which itself can be plugged, for example, into an electrical plug-in connector located behind the wall opening. The locking elements have assigned to them deflection faces on the outer circumference of the plug. The plug and packing element end or coupling piece are inserted together into the wall opening. The locking elements of the coupling piece engage behind the wall opening in the course of insertion of the plug and are spread apart by the deflection faces during the further insertion of the plug. The locking elements eventually overrun the deflection faces and are secured in a spread-apart position.

2 Claims, 1 Drawing Sheet

PACKING ELEMENT

BACKGROUND AND SUMMARY OF THE INVENTION

The present invention relates to a packing element with a connecting piece, having locking elements, for fixing the packing element in relation to a wall bushing, to be covered by them, of a space for holding a base for fixing a plug.

Packing elements of this kind are known and are used in Mercedes-Benz motor vehicles of Type W 124 (200 D-500 E series) in order to sheath an end piece of a cable harness, which is already provided with a plug, for the purpose of protecting this end piece. The end piece is led out of an already premounted and precabled door of a passenger vehicle and, by means of its plug, is connected to a plug-in connector which is seated inside a pillar of a vehicle body holding the door and forms the base.

Usually, the bellows-like packing element is first plugged onto the end piece of the cable harness which bears the plug and is secured with its one end to a wall bushing of the door by clipping. Subsequently, the plug is plugged through the wall bushing of the vehicle body pillar, plugged into the plug-in connector integrated in this pillar and secured in the connector.

Finally, the packing element is to be secured with its free end by means of the locking elements provided on its connecting piece, by clipping into the wall bushing of the vehicle body pillar.

The connection of the cable harness to the plug-in connector thus requires on the side of the vehicle body pillar two separate operations, which is correspondingly troublesome and time-consuming. The subsequent clipping in of the packing element into the opening of the vehicle body pillar which is to be carried out after the plugging in of the plug into the plug-in connector needs to be handled carefully since incomplete clipping in can lead to leaking. The clipping in of the packing element is more troublesome than clipping it into the wall bushing of the door because the wall bushing is then already attached to the vehicle body pillar and therefore less free space is available for handling the packing element.

An object of the present invention is to provide a packing element which can be mounted on the pillar side in a substantially simpler and more advantageous manner.

This object is achieved according to the invention by a packing element with a connecting piece, having locking elements, for fixing the packing element in relation to a wall bushing, to be covered by it, of a space for holding a base for fixing a plug. The connecting piece constitutes a coupling piece, which is connected to the plug and whose locking elements can be spread apart, engaging behind the wall bushing, over deflection faces assigned to the plug and, spread apart by the deflection faces, can be overrun during the further insertion of the plug.

A preferred embodiment of the present invention allows the end piece of the cable harness which bears the plug and hangs out of the door to be mounted, together with the end of the packing element which is to be secured on the pillar side, on the vehicle body pillar in a single operation.

The present invention permits the plug to be connected, even before the attachment of the door to the vehicle body pillar, to the coupling piece at the free end of the packing element which is already secured to the door.

After the mounting of the door on the vehicle body pillar, the constructional unit formed from the plug and coupling piece of the packing element is then inserted into the pillar-side wall bushing.

When the plug and plug-in connector are brought into engagement with one another, deflection faces provided on the plug side in certain embodiments spread apart of the locking elements of the packing element coupling piece which engage behind the wall bushing of the vehicle body pillar. With the locking elements in the spread-apart state, the plug is then pushed into its final plug-in position relative to the coupling piece. The locking elements are overrun by the plug-side deflection faces, and a relative movement occurs between the plug and packing element coupling piece secured in the wall bushing.

Other objects, advantages and novel features of the present invention will become apparent from the following detailed description of the invention when considered in conjunction with the accompanying drawings.

DETAILED DESCRIPTION OF THE DRAWINGS

Figure 1:
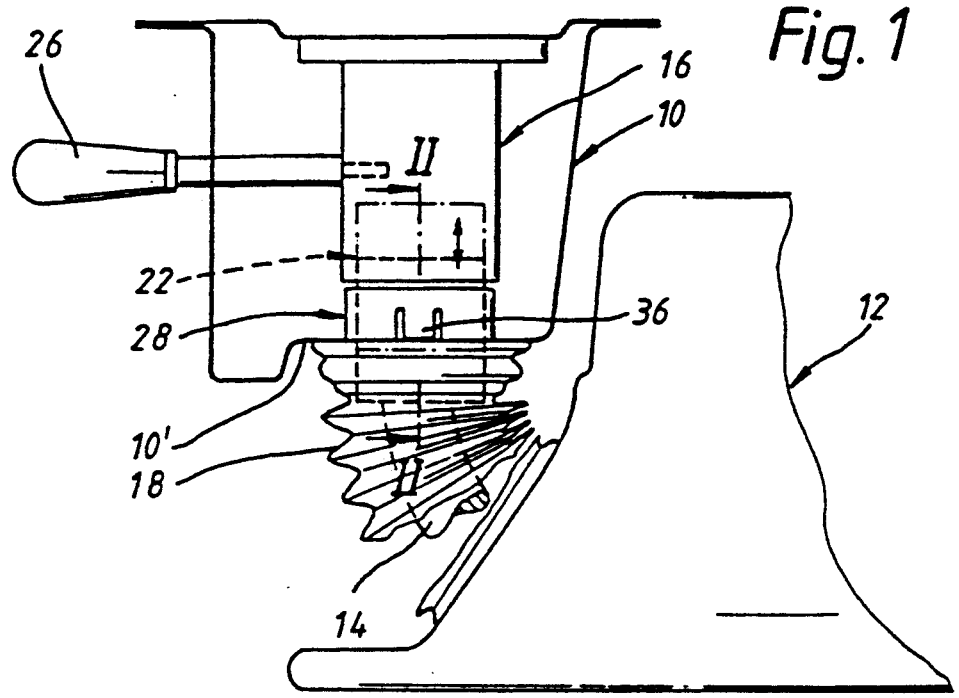
FIG. 1 shows in highly diagrammatic form a plan view of a vehicle body pillar constructed in accordance with an embodiment of the present invention, with a vehicle door indicated in its closed position, the vehicle body pillar being illustrated in cross-section and the plug and packing element coupling piece being illustrated after insertion into the wall bushing of the vehicle body pillar.

In FIG. 1, reference numeral 10 designates a pillar, for example the B pillar of a vehicle body, and 12 designates a vehicle rear door coupled to the pillar 10 by means of hinges and illustrated in its closed position.

A multiplicity of cables laid in the vehicle door 12 for driving electrical loads is combined to form a cable harness 14 and is to be connected to an electrical plug-in connector 16 integrated into the B pillar 10.

Figure 2:
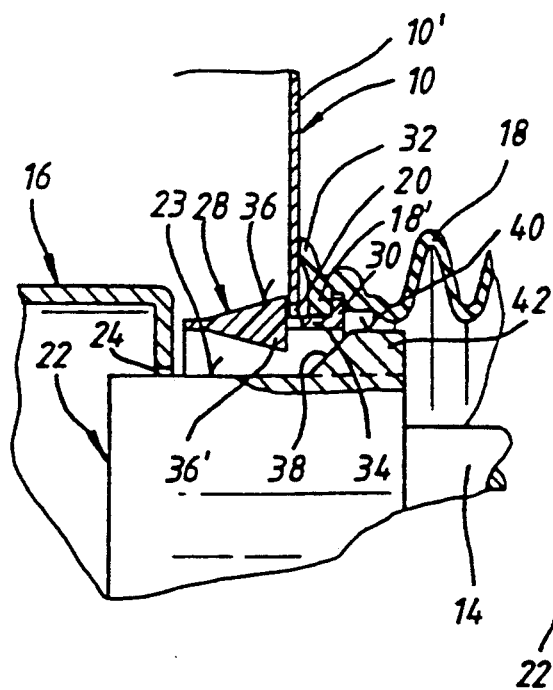
FIG. 2 shows a partial section along the line II-II in FIG. 1, in a larger scale than FIG. 1.

The section of the cable harness 14 running between the B pillar 10 and the vehicle door 12 is surrounded by a bellows-like packing element 18 which serves both as a protection for the cable harness 14 and for sealing the wall bushings, penetrated by the cable harness 14, of the B pillar 10 and vehicle door 12. In FIG. 2, the pillar-side wall bushing is designated by 20.

A multipin plug 22, which is connected to the cable harness 14 and which, after being plugged into a plug-in opening 24 of the plug-in connector 16, can be drawn in a known manner into its defined plug-in position in the plug-in connector 16 by a drawing-in device. This drawing-in device is integrated into the plug-in connector 16 and can be actuated by means of an actuating tool 26 which can be placed on the plug-in connector 16. The actuating tool 26 connects the individual cables, combined to form the cable harness 14, to the plug-in connector 16.

A coupling piece 28 engages in a positively locking manner with an outer flange 30 into a groove on the inner circumference of the end piece 18' of the packing element having an outer flange 32 and is thus securely held therein against being pulled out. The coupling piece 28 is inserted into the end of the packing element 18 to be connected to the pillar 10.

Figure 3:
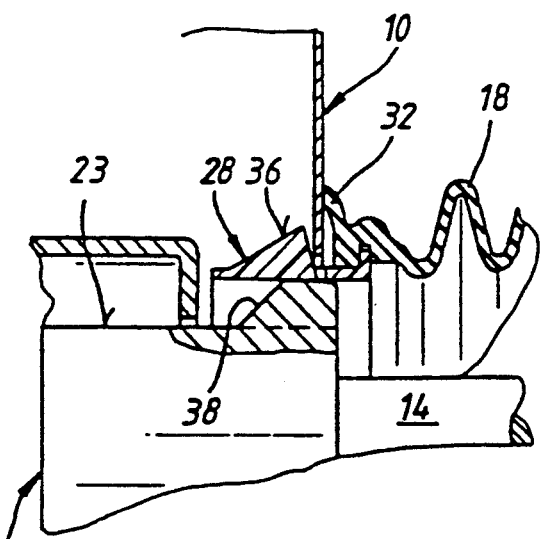
FIG. 3 shows an illustration similar to FIG. 2, the plug being illustrated in its final plug-in position in the plug-in connector of the vehicle body pillar.

The coupling piece 28 has a casing 34 which is of, for example, cylindrical and elongated construction and is equipped on circumferential sections lying opposite one another, in accordance with FIGS. 2 and 3, with a locking element in each case at the top and bottom. In certain embodiments, the locking element is in the form of a formed-on locking tongue 36.

The tongue 36, viewed in longitudinal section in accordance with FIG. 2, is of conical construction such that it tapers in the direction of the plug-in connector 16 and protrudes approximately the same amount beyond the outer circumference and the inner circumference of the coupling piece 28.

The tongue part element 36' of the locking tongues 36 which protrudes beyond the inner circumference of the coupling piece 28 has assigned to it, on the outer circumference of the multipin plug 22, in each case one wedge face 38 which rises obliquely in the direction of the end of the multipin plug 22 held in the packing element 18 and serves as a deflection face, a horizontal deflection face part 40 adjoining against the wedge face 38, in accordance with FIGS. 2 and 3. In the illustrated embodiment, the wedge face 38 forms the end face of a cam 42 whose rear face forms the deflection face part 40.

The following procedure can be used to connect the multipin plug 22 and packing element 18 to the B pillar 10:

The multipin plug 22 is to be plugged into the coupling piece 28, facing away from the vehicle door 12, of the packing element 18 in such a way that the locking tongues 36 of the coupling piece 28 are now opposite the cylindrical outer circumferential face 28 of the plug 22.

After this, the mutipin plug 22 together with the coupling piece 28 are to be inserted together with their front part as a unit into the wall opening of the B pillar 10 which forms the wall bushing 20, and at the same time the multipin plug 22 is to be plugged into the plug-in opening 24 of the plug-in connector 16. Here, the locking tongues 36 can swivel radially inwards when passing through the wall bushing 20 and, when their entire length has passed through the wall bushing 20, assume their position shown in FIG. 2 again. During this process, they snap outwards and engage behind the wall part 10' whereas the packing element outer flange 32 has already previously come to bear in a sealing fashion against this wall part 10.

Now, the drawing-in device of the plug-in connector 16 is to be actuated by means of the actuating tool 26 in order to draw in the multipin plug 22 into its final contact position in the plug-in connector 16.

In the course of this drawing-in movement, the inner part 36' of the locking tongues 36 runs onto the wedge face 38 assigned to them so that the locking tongues 36 finally assume the locking position shown in FIG. 3.

Before the multipin plug 22 has in this way reached its defined plug-in position in the plug-in connector 16, the inner part 36' of the locking tongues 36 slides onto the rear face 40 of the cam 42. Accordingly, with the packing element 18 already locked, a relative movement can then occur between the multipin plug 22 and the spread-apart locking tongues 36 of the coupling piece 28. Thus, in the final plug-in position of the multipin plug 22, it is not possible for the packing element 18 to come away from the wall part 10' of the B pillar 10.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed:

1. An arrangement comprising:
   a packing element with a connecting piece that has locking elements, the locking elements fixing the packing element in relation to a wall bushing of a space for holding a base for fixing a plug;
   a plug having deflection faces engageable behind the wall bushing, the deflection faces being formed by an end face which forms a wedge face of a cam formed on the outer circumference of the plug and extends in the direction of insertion of the plug;
   wherein the connecting piece includes a coupling piece connectable to the plug, the locking elements of the connecting piece being spreadable from one another over deflection faces assigned to the plug and engageable behind the wall bushing, the locking elements overrunning during further insertion of the plug.

2. The arrangement according to claim 1, wherein the locking elements are approximately conical and in a non-spread apart state protrude beyond at least an outer circumference and an inner circumference of the coupling piece.

* * * * *